(12) United States Patent
Boier-Martin et al.

(10) Patent No.: US 7,257,250 B2
(45) Date of Patent: Aug. 14, 2007

(54) SYSTEM, METHOD, AND PROGRAM PRODUCT FOR EXTRACTING A MULTIRESOLUTION QUADRILATERAL-BASED SUBDIVISION SURFACE REPRESENTATION FROM AN ARBITRARY TWO-MANIFOLD POLYGON MESH

(75) Inventors: Ioana M. Boier-Martin, Pelham Manor, NY (US); Jingyi Jin, Champaign, IL (US); Holly E. Rushmeier, Mount Kisco, NY (US); Fausto Bernardini, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 10/696,348

(22) Filed: Oct. 29, 2003

(65) Prior Publication Data

US 2005/0093862 A1 May 5, 2005

(51) Int. Cl.
*G06K 9/00* (2006.01)
(52) U.S. Cl. .................................... 382/154
(58) Field of Classification Search ................. 382/154
See application file for complete search history.

(56) References Cited

OTHER PUBLICATIONS

Automatic Reconstruction of B-Spline Surfaces of Arbitrary Topological Type Matthias Eck University of Darmstadt, Hugues Hoppe Microsoft Research pp. 1-10.*
Dijkstra's Algorithm by: Corman, Leiserson, Rivest, pp. 527.
A Voroni Graph, by: Okabe, et al pp. 65.
Recursively Generated B-Spline Surfaces On Arbitrary Topological Meshes by: E Catmull and J Clark, pp. 350-355.
Algorithms For The Reduction Of The Number Of Points Required To Represent A Digitized Line Or Its Caricature, by: David H. Douglas and Thomas K. Peucker, pp. 112-117.
Cut-and-Paste Editing of Multiresolution Surfaces, by Henning Biermann, Ioana Martin, Fausto Bernardini, and Denis Zorin, pp. 1-10.
Constrained Centroidal Voroni Ressellations For Surfaces, by: Qiang Du, Max D. Gunzburger and Lili Ju, pp. 1488-1506.
MeshToSS: Converting Subdivision Surfaces From Dense Meshes, by: Takashi Kanai, Keio University, Faculty of Environmental Information Endo 5322, Fujisawa-city, Kanagawa, 252-8520, Japan, pp. 325-332 (all marked 666).
Hierarchical Face Clustering On Polygonal Surfaces, by: Michael Garland, Andrew Willmott, Paul S. Heckbert, pp. 1-10.
Automatic Reconstruction of B-Spline Surfaces of Arbitrary Topological Type, by: Matthias Eck, Univerity of Darmstadt, and Hugues Hoppe, Microsoft Research, pp. 325-334.
Hierarchical Mesh Decomposition Using Fuzzy Clustering and Cuts, by: Sagi Katz and Ayellet Tal, Department of Electrical Engineering, Technion-Israel Institute of Technology, pp. 1-8.
Fitting Smooth Surfaces to Dense Polygon Meshes, by: Venkat Krishnamurthy, Marc Levoy, Computer Science Department, Stanford University, pp. 1-12.

(Continued)

*Primary Examiner*—Matthew C. Bella
*Assistant Examiner*—Mike Rahmjoo
(74) *Attorney, Agent, or Firm*—Rafael Perez-Pineiro

(57) ABSTRACT

Disclosed is an improved computer system, method, and program product that has one or more input devices for receiving one or more input meshes representing a three dimensional model. The three dimensional model is capable of being represented as a 2-manifold triangular mesh. A conversion process automatically converts the input mesh to a multiresolution quadrilateral-based subdivision surface (MQSS) representation.

16 Claims, 14 Drawing Sheets

OTHER PUBLICATIONS

MAPS: Multiresolution Adaptive Parameterizatio of Surfaces, by: Aaron W.F. Lee, (Princeton University) Wim Sweldens, (Bell Laboratories) Peter Schroder, (Caltech) Lawrence Cowsar, (Bell Laboratories) David Dobkin, (Princeton University), pp. 95-104.

Shape Distributions, by: Robert Osada, Thomas Funkhouser, Bernard Chazelle, and David Dobkin, pp. 1-32.

Straightest Geodesics on Polyhedral Surfaces, by: Konrad Polthier, Markus Schmies, pp. 1-16, (drawings pp. 382-383).

* cited by examiner

SYSTEM, METHOD, AND PROGRAM PRODUCT FOR EXTRACTING A MULTIRESOLUTION QUADRILATERAL-BASED SUBDIVISION SURFACE REPRESENTATION FROM AN ARBITRARY TWO-MANIFOLD POLYGON MESH

FIELD OF THE INVENTION

This invention relates to the field of computer graphics. More specifically, the invention relates to converting arbitrary polygon meshes to multiresolution subdivision surfaces.

DEFINITIONS

The following formally define fundamental mathematical concepts used throughout this description. See any standard textbook on fundamental concepts of mathematics and computational geometry.

An n-manifold is a topological space which is locally Euclidean, i.e., around every point, there is a neighborhood which is topologically the same as the open unit ball in $\mathcal{R}^n$, $n \geq 2$.

A 2-manifold is an n-manifold with n=2.

A map $\phi$: A→B is said to constitute a homeomorphism between A and B if it is continuous, bijective, and has a continuous inverse.

A coordinate chart is a way of expressing the points of a small neighborhood on a manifold M as coordinates in Euclidean space. Formally, a coordinate chart is a map: $\phi$: U→V where U is an open set in M, V is an open set in $\mathcal{R}_n$ and n is the dimension of the manifold. The map $\phi$ must be a homeomorphism.

An atlas is a collection of consistent coordinate charts on a manifold. As the name suggests, an atlas corresponds to a collection of maps, each of which shows a piece of a manifold and looks like the flat two-dimensional Euclidean space. To use an atlas, one needs to know how the maps overlap. To be useful, the maps must not be too different on these overlapping areas.

A Voronoi diagram (or Dirichlet tessellation) is a partitioning of an input data set around n points called seeds into n regions (also known as cells) such that each region contains exactly one point and every point in a given region is closer to its seed than to any other point. A centroidal Voronoi diagram (CVD) has the property that each seed lies at the center of its region (cell). A constrained centroidal Voronoi diagram (CCVD) has the property that the seed points are the constrained mass centroids of their associated regions (see also Du et al., Constrained Centroidal Voronoi Tessellations for Surfaces, SIAM Journal for Scientific Computing, 24(5), pp. 1488-1506, 2003).

A scalar field is a continuous function $\Phi$: $\Omega \to \mathcal{R}$, where $\Omega$ is a connected domain in $\mathcal{R}_n$, $n \geq 1$. The image of $\Phi$ embedded in $\mathcal{R}^{n+1}$ space, i.e., $\mathfrak{I} = \{(X, \Phi(X)) | X \in \Omega\} \subset \mathcal{R}^{n+1}$ is called a hypersurface. When n=2, $\mathfrak{I}$ is called a height field.

The medial axis transform (MAT) of an object is defined as the set of maximal balls completely contained within the object. The medial axis (MA) consists of the centers of the balls and intuitively can be viewed as the skeleton of the object.

Subdivision defines a smooth surface recursively as the limit of a sequence of meshes. Each finer mesh is obtained from a coarser mesh by using a set of fixed refinement rules. Examples of suitable rules are the Catmull-Clark subdivision rules (see E. Catmull and J. Clark, Recursively Generated B-Spline Surfaces on Arbitrary Topological Meshes, CAD 10(6), pp. 350-355, 1978). In the preferred implementation Catmull-Clark rules are used, but this is not a limitation upon the practice of this invention. Any quadrilateral-based subdivision rules for 3D models can be used.

Multiresolution subdivision surfaces extend subdivision surfaces by introducing details at each level. The coarsest-level mesh is sometimes also called the base mesh. Each time a finer mesh is computed, it is obtained by adding detail offsets to the subdivided coarser mesh. If given a semi-regular mesh, i.e., a mesh with subdivision connectivity, one can easily convert it to a multiresolution surface by defining a smoothing operation to compute vertices on a coarser level from a finer level. The details are computed as differences between levels.

The valence of a vertex of a mesh is defined as the number of mesh faces adjacent to that vertex. An interior vertex of the base mesh is called an extraordinary vertex if it has valence different than four. All other interior vertices in a semi-regular representation have valence four and are called regular vertices. Vertices on the boundary of an open mesh are considered regular if they have valence two and extraordinary otherwise. A mesh with subdivision connectivity is also called a semi-regular mesh.

BACKGROUND OF THE INVENTION

Depending on the application, mesh decompositions may have different requirements regarding the properties of the constituent elements. For example, for skeleton extraction, prior art methods produce decompositions With complex components, possibly with higher than zero-genus. [See S. Katz and A. Tal, ACM TOG. Special issue for SIGGRAPH conference, Proceedings of Siggraph 2003, 2003]. Such decompositions may be suitable for restricted problems such as approximate skeleton extraction, but would require further, non-trivial processing for most other applications. For example, texture mapping involves associating 2D color images with regions of a 3D mesh. To establish such an association, an atlas consisting of charts that can be easily mapped to the planar domains of the images is necessary. The same holds true for semi-regular remeshing problems, where the charts serve as faces of a coarse polyhedral base domain over which the remeshing is performed.

Attention is drawn to the problem of finding atlas decompositions which satisfy several important properties:

1. The number of patches in the atlas is small. Typically, the complexity of algorithms processing the patches is proportional to the number of patches. Obviously, for efficiency reasons, it is highly desirable to keep this number as small as possible.
2. Patches should be compact, with nice and simple shapes. For instance, it is common practice for textures to be packed into a single, nearly square image for rendering purposes. Shapes with irregular boundaries make packing inefficient and waste texture memory. Also, it becomes easier to apply editing operations to textures directly when they appear as humanly recognizable pieces. Similarly, for the purpose of remeshing it the faces of the base domain faces should be nicely-shaped polygons. Last but not least, for parameterization purposes, a simple shape often translates into a simpler parameterization algorithm and reduced distortion.

Prior methods for mesh decomposition can be classified into two main categories, according to whether they require some degree of user involvement in defining the component charts or not. Semi-automatic methods require manual outlining of one or more chart boundaries or some other defining properties of the charts. (See for example V. Krishnamurthy and M. Levoy, Fitting Smooth Surfaces to Dense Polygon Meshes, Proceedings of SIGGRAPH 96, pp. 313-324, 1996.) Fully automatic methods produce atlases without the need for interactive adjustment of charts. Our proposed method falls into the latter category and solves a significant number of problems which prior art fails to address.

PROBLEMS WITH THE PRIOR ART

Many atlas decomposition methods produce irregularly shaped charts which are not suitable for remeshing and may be used only with difficulty, loss in efficiency and/or additional processing for texture mapping. Most such methods take a greedy approach and generate charts by normal bucketing, accumulating triangles of the input mesh one-by-one while checking the orientation of the surface normal. Such approaches can result in a large number of patches for objects with many small features. In most cases, there is not enough control over the shape of the charts, which can become rather irregular. As a result, they cannot be used directly for mesh extraction. See M. Garland, A. Willmott, and P. Heckbert, Hierarchical Face Clustering on Polygonal Surfaces, Proceedings of ACM Symposium on Interactive 3D Graphics, 2001.

The majority of existing automatic methods for semi-regular remeshing target triangle-based subdivision schemes and are not applicable to quadrilateral remeshing. They are typically based on a mesh simplification scheme which takes a fine triangle mesh and decimates it into a coarse triangle mesh. The coarse triangle mesh is then used as a base mesh for Loop subdivision. (See, for example, A. W. F. Lee, W. Sweldens, P. Schroeder, L. Cowsar, and D. Dobkin, MAPS: Multiresolution Adaptive Parameterization of Surfaces, Proceedings of SIGGRAPH 98, pp.95-104, 1998 and T. Kanai, "MeshToSS: Converting Subdivision Surfaces from Dense Meshes", Proc. Modeling and Visualization 2001", pp. 325-332, 2001). There is no straightforward process that would adapt this process to quadrilateral remeshing as there is no simplification scheme that decimates a polygon mesh into a coarse quadrilateral mesh.

The human eye is sensitive to the variations of light intensity reflected from an object.

The light intensity depends on the angle between the object surface normal and a light source. Shape variations that result in large variation variations in the surface normal—changes in curvature such as ridges, creases or ravines in the surface—are then particularly noticeable to a human observer, that is they are perceptually salient. Existing methods typically produce charts that are not specifically aligned with the salient features of the input model. A large number of charts is hence required to ensure a good approximation after remeshing with a reasonable number of subdivision levels.

Some methods have been proposed that produce a quadrilateral base mesh by first generating a triangle base mesh followed by a grouping of triangles into quadrilaterals. (See M. Eck and H. Hoppe, Automatic Reconstruction of B-Spline Surfaces of Arbitrary Topological type, Proceedings of Siggraph 1996, pp. 325-334, 1996). In addition to being inefficient, such an approach is not always guaranteed to work: the triangle mesh would have to have an even number of triangles and even then, there is no guarantee that a complete pair wise matching of triangles into quadrilaterals can be found. No alignment to salient model features is sought.

Finally, for texture mapping, if the charts are not height fields, they first have to be flattened before the texture can be applied. Hence, the texture images corresponding to the charts are distorted by flattening and they do not appear the same as they do on the model. This makes it difficult to do touch up edits of the textures in 2D, having to work instead with the texture applied to the 3D model.

All above cited references are herein incorporated by reference in their entirety.

ASPECTS OF THE INVENTION

An aspect of this invention is an improved system and method for converting arbitrary polygon meshes to multiresolution subdivision surfaces.

An aspect of this invention is an improved system and method for converting arbitrary polygon meshes to multiresolution subdivision surfaces accounting for model features.

An aspect of this invention is an improved system and method for converting arbitrary polygon meshes to quadrilateral-based multiresolution subdivision surfaces.

An aspect of this invention is an improved system and method for providing atlases that can be used for various applications (e.g., for low distortion texture mapping, for model parameterization)

SUMMARY OF THE INVENTION

The present invention is an improved computer system, method, and program product that has one or more input devices for receiving one or more input meshes representing a three dimensional model. The three dimensional model is capable of being represented as a 2-manifold polygon mesh. A conversion process automatically converts the input mesh to a multiresolution quadrilateral-based subdivision surface (MQSS) representation.

BRIEF DESCRIPTION OF THE FIGURES

The foregoing and other objects, aspects, and advantages will be better understood from the following non limiting detailed description of preferred embodiments of the invention with reference to the drawings that include the following:

FIG. 2, comprises FIGS. 2A through 2O, and illustrates various steps in a process of conversion from an arbitrary 2-manifold mesh to a MQSS representation.

DETAILED DESCRIPTION OF THE INVENTION

This invention relates to the remeshing of three dimensional models represented by 2-manifold polygon meshes. The remeshing method is automatic and efficient, allowing the processing of large meshes.

Figure 1:
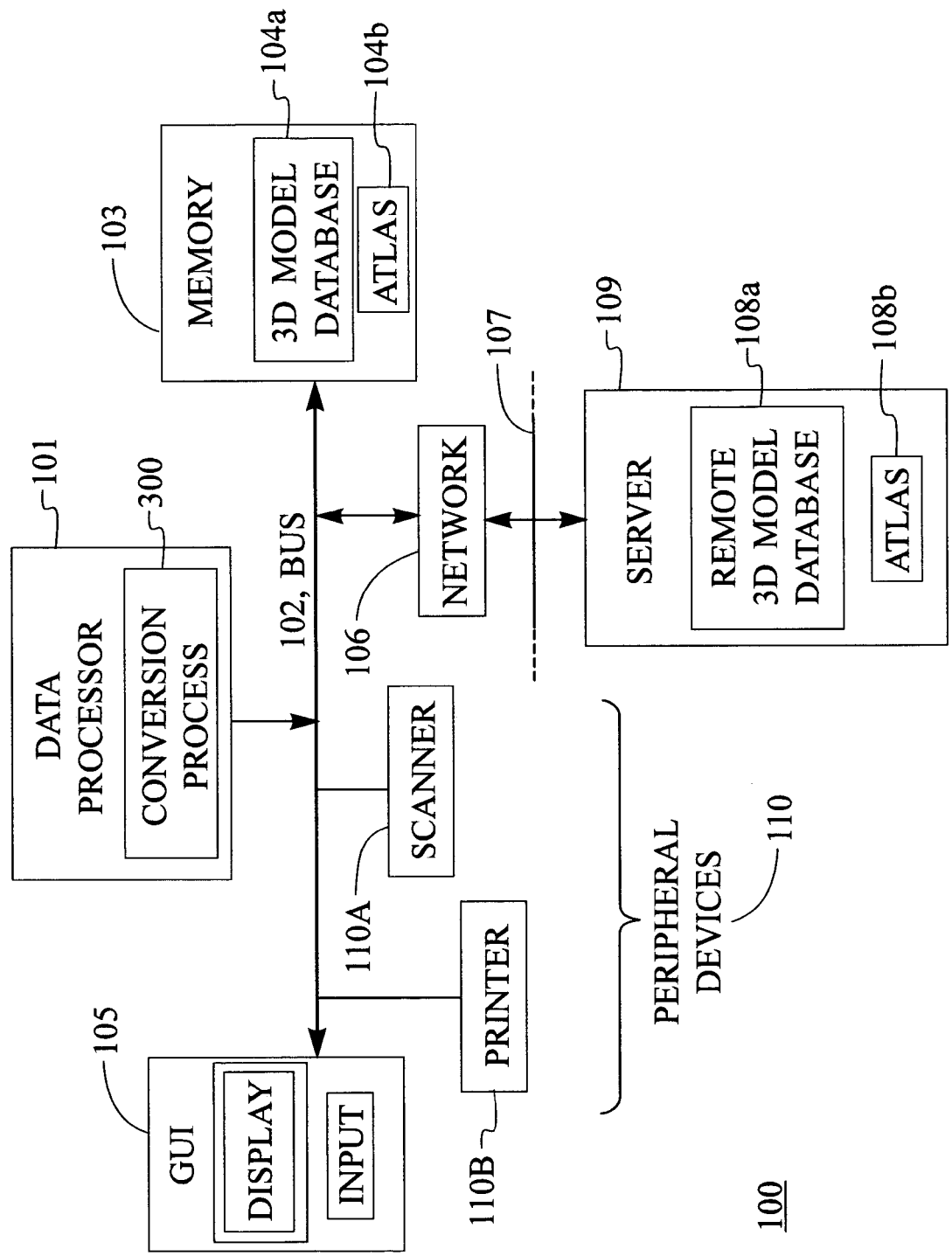
FIG. 1 is a block diagram on one preferred embodiment of the present system.

FIG. 1 is one example and simplified block diagram of a preferred data processing system 100 that is suitable for practicing this invention. The data processing system 100 includes at least one data processor 101 coupled to a bus 102 through which the data processor 101 may address a memory sub-system 103, also referred to herein simply as the memory 103. The memory 103 may include RAM, ROM and fixed and removable disks and/or tape. The memory 103 is assumed to store a program containing program instructions for causing the data processor 101 to execute methods in accordance with the teachings of this invention. Also stored in the memory 103 can be at least one database 104 of digital 3D models, such as models of objects, certain non-limiting examples of which are shown in FIG. 2. The digital model data may include models obtained by scanning real objects using a 3D scanner, digital models created using a computer, models imported from existing databases, and/or models generated by or derived from any suitable means. In general, the digital model data may be any desired type or types of 3D models, including but not limited to digital models of persons, places, animals, plants, mechanical parts and assemblies, packaging, containers, abstract forms and so forth.

The data processor 101 is also coupled through the bus 102 to a user interface, preferably a graphical user interface (GUI) 105 that includes any one or more of the following well known user interface devices: a keyboard, a mouse, a trackball, a voice recognition interface, and any general purpose user display device, such as a high resolution graphical CRT display terminal, a LCD display terminal, or any suitable other display device.

The data processor 101 may also be coupled through the bus 102 to a network interface 106 that provides bidirectional access to a data communications network 107, such as an intranet and/or the internet. Coupled to the network 107 can be one or more sources and/or repositories of digital models, such as a remote digital model database 108 that is reachable through an associated server 109.

The data processor 101 is also preferably coupled through the bus 102 to at least one peripheral device 110, such as a scanner 110A (e.g., a 3D scanner) and/or a printer 110B and/or a 3D model making apparatus, such as a rapid prototyping system, and/or a computer controlled fabrication system.

In general, this invention may be implemented using one or more software programs running on a personal computer, a server, a microcomputer, a mainframe computer, a portable computer, and embedded computer, or by any suitable type of programmable data processor 101.

Given this disclosure, many other system architectures would become known to one skilled in the art.

The use of this invention substantially improves the remeshing of 3D model data for many applications (for example, model editing and compression).

The teachings of this invention can also be configured to provide high-quality atlas decompositions of 3D models for various applications (for example, texture mapping). The methods may be used to process the digital 3D model data stored in the 3D model database 104a and/or in the remotely stored 3D model database 108 over the network 107 and in cooperation with the server 109. As but one example, a 3D input model to be remeshed could be remotely stored in the 3D model database 108a, while the remeshed 3D model represented as a multiresolution subdivision surface could be stored in the local 3D model database 104.

In a preferred implementation, the atlas 104b, 108b may be implemented as a collection of clusters of faces of the input mesh, each cluster corresponding to a chart of the atlas and containing pointers to mesh faces that are part of it. Typically, this data would be stored in memory 103 as shown in FIG. 1. However, any other data structures representing the atlas are possible and are covered by the present invention along with other methods of storing them, possibly at a remote location 109 on a network.

Figure 3:
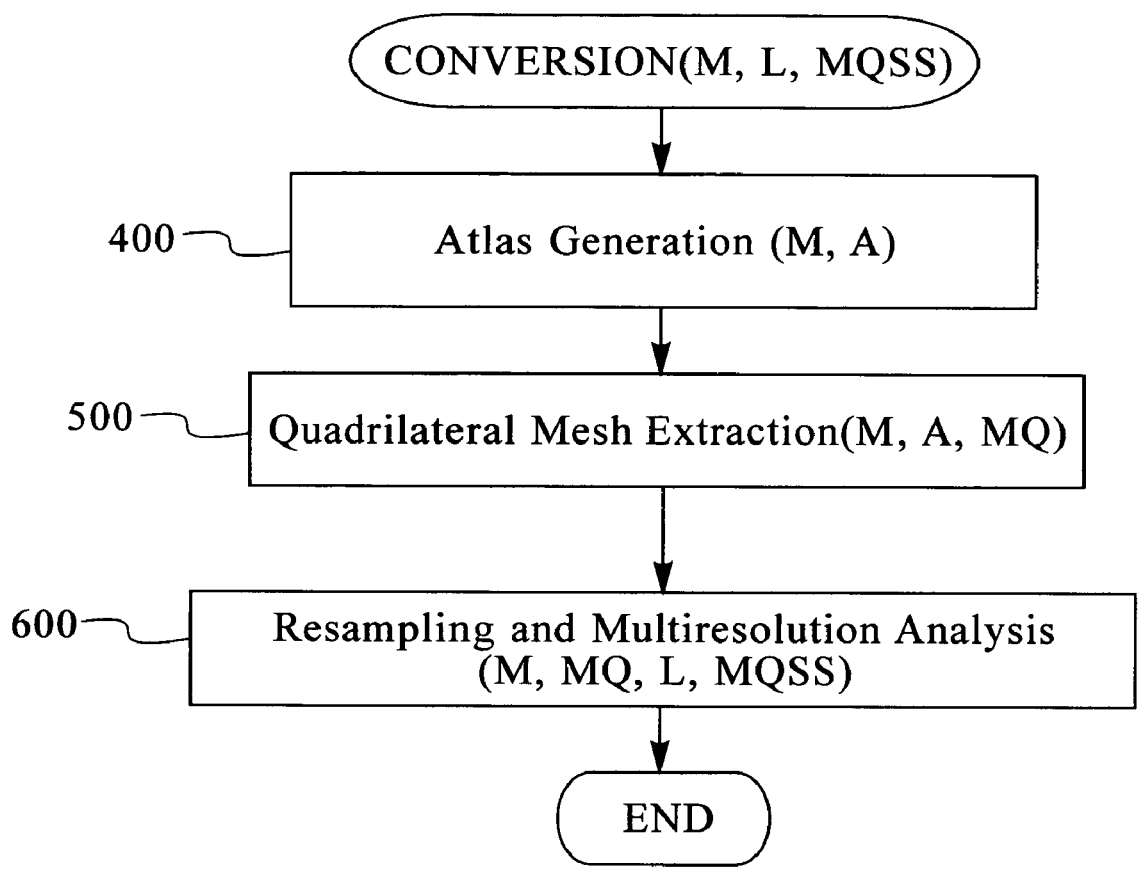
FIG. 3 is flow chart of a conversion process.

The invention includes a conversion process 300, shown in more detail in FIG. 3.

FIG. 2 is a series of example model illustrations showing the results of performing the steps of the conversion process 300. The parts of FIG. 2 are: (A) an example input model, (B) a wireframe rendering illustrating the underlying arbitrary triangle mesh representation of the input model, (C) face normals encoded as colors per face over the model, (D) smoothing of colors to remove noise and tessellation artifacts, (E) initial decomposition by color quantization, (F) cleanup of previous partition (notice some straightening of chart boundaries and removal of small charts), (G) centroidal Voronoi diagram around the centers marked with black dots in (F) (note that somecharts are not height fields), (H) splitting of charts into height fields, (I) additional cleanup and boundary straightening, (J) boundaries of charts are extracted to form a base domain for use in remeshing with subdivision connectivity, (K) further cleanup to improve the coarse mesh, (L) quadrilateral mesh obtained by applying one step of catmull-Clark subdivision to the mesh in (K), and (M)-(O) three consecutive levels of the multiresolution hierarchy built on top of the base domain shown in (L).

Figure 5:
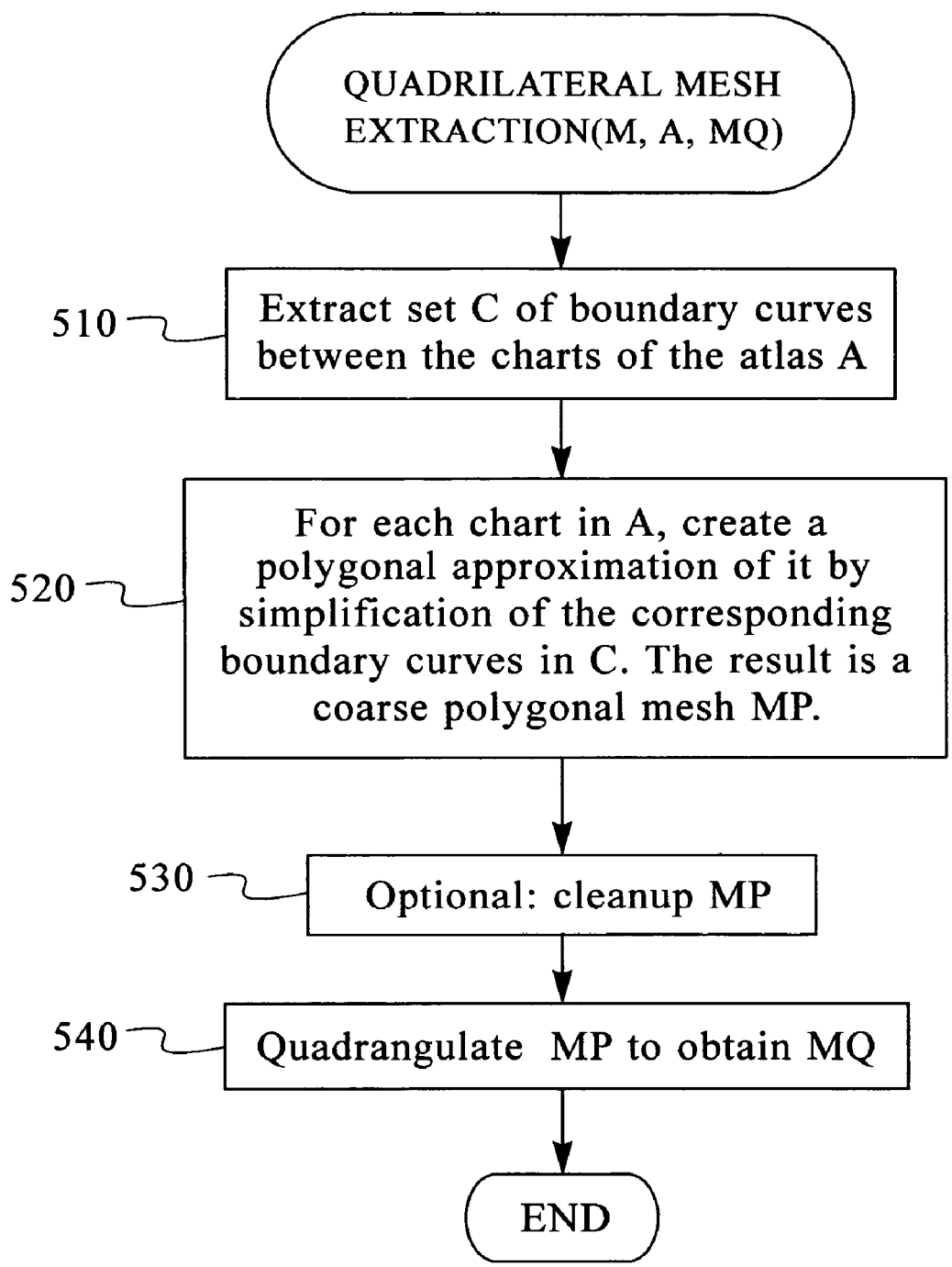
FIG. 5 is a flow chart of the quadrilateral base mesh extraction process.
Figure 6:
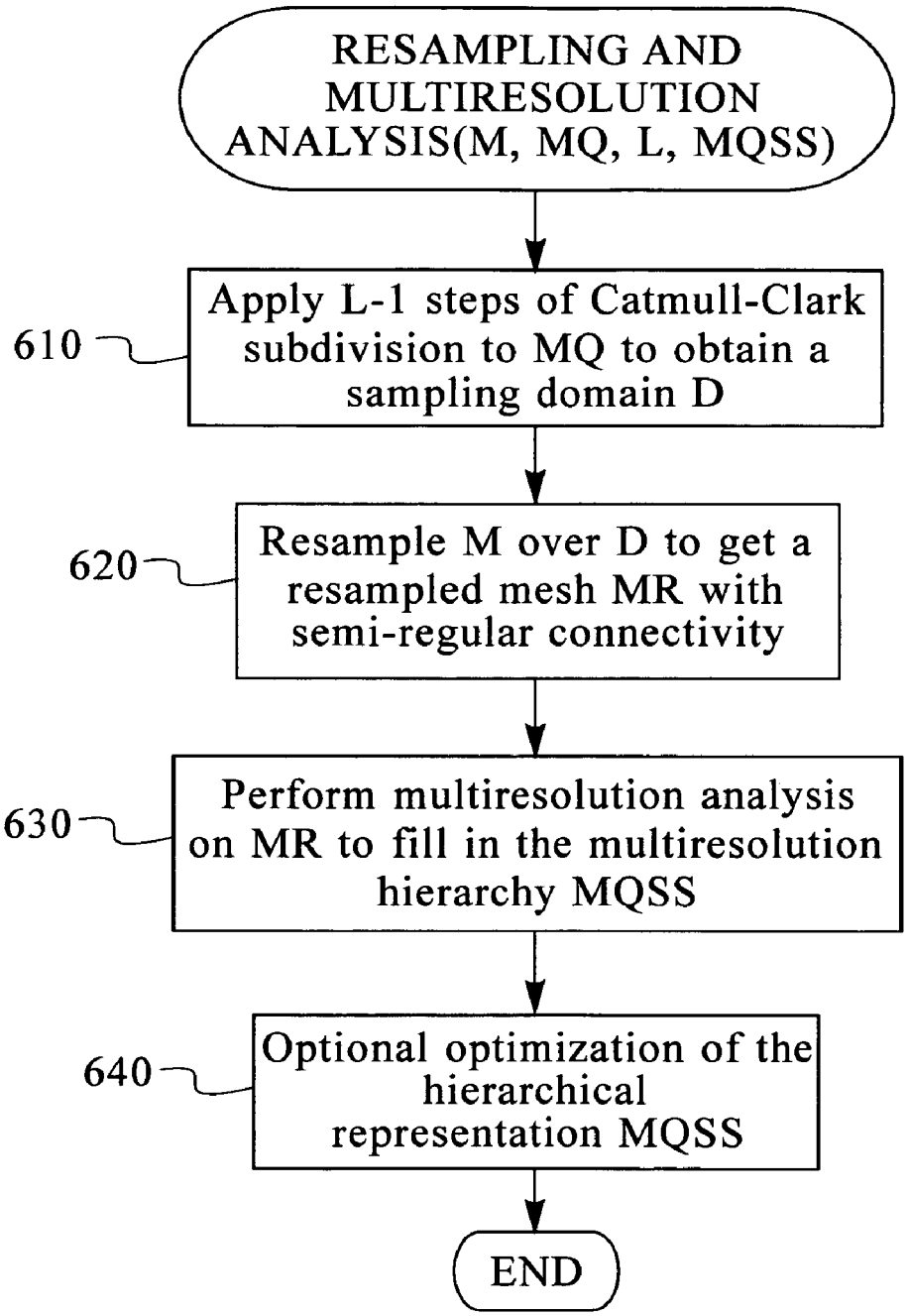
FIG. 6 is a flow chart of the resampling and analysis process.

FIG. 3 is flow chart of the conversion process 300 comprising the steps of atlas generation 400 (described in detail in FIG. 4), quadrilateral mesh extraction 500 (described in detail in FIG. 5), and resampling and multiresolution analysis 600 (described in detail in FIG. 6).

Figure 4:
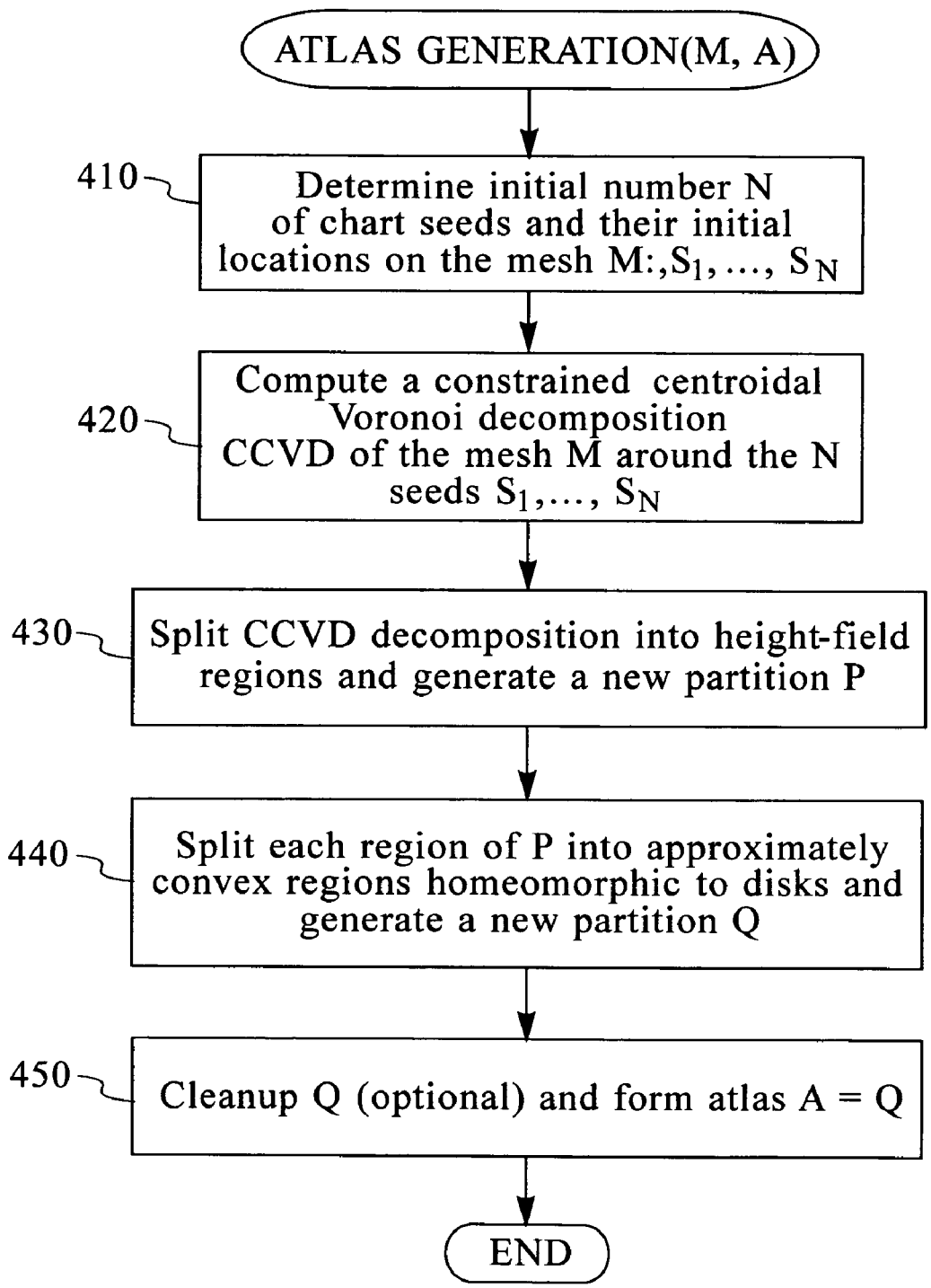
FIG. 4 is a flow chart of an atlas generator process.

FIG. 4 is a flow chart of an atlas generator process 400. Generally, a 2-manifold polygon mesh M is input to the process 400 and the process 400 outputs an atlas A of charts partitioning M.

In process 400, an atlas decomposition is found for the input mesh using a combination of clustering techniques as described below. The resulting altas is made of charts that have several properties:

1. The charts are non-overlapping, i.e., forming a partition of the input mesh.
2. The charts correspond to simple, nicely-shaped regions of the input mesh.
3. Each chart approximates a height field over some planar-domain.
4. Each chart is homeomorphic to a disk.
5. The network of curves delineating the boundaries of the charts forms a wireframe mesh in which the majority of vertices have low valence.

The process 400 comprises the following steps (with more detail given below):

1. determining an initial number of chart seeds with their locations 410, see FIG. 4A, below.
2. computing a constrained centroidal Voronoi decomposition (CCVD) 420, see FIG. 4B, below.
3. splitting the CCVD into height-field charts and generating a new partition 430, see FIG. 4C, below.
4. splitting each region of P into approximately convex regions homeomorphic to disks and generating a new partition Q 440, see FIG. 4D, below.
5. cleanup (optional) 450

Reference can also be made to FIGS. 2A through 2I.

To generate an atlas over the input mesh, a number N of initial seed points is generated over the mesh according to some distribution. For example, for a given N, the seed points could be generated using a random placement process that uniformly distributes points over the mesh (see R. Osada, T. Funkhouser, B. Chazelle, and D. Dobkin, Shape Distributions, ACM Transactions on Graphics, 21(4), October, 2002, for an example of such process). Alternatively, a suitable number N and initial locations of the N seeds on the mesh could be estimated using a seed generation process 410 as shown in FIG. 4A (see also FIG. 2F and FIG. 7).

Figure 4A:
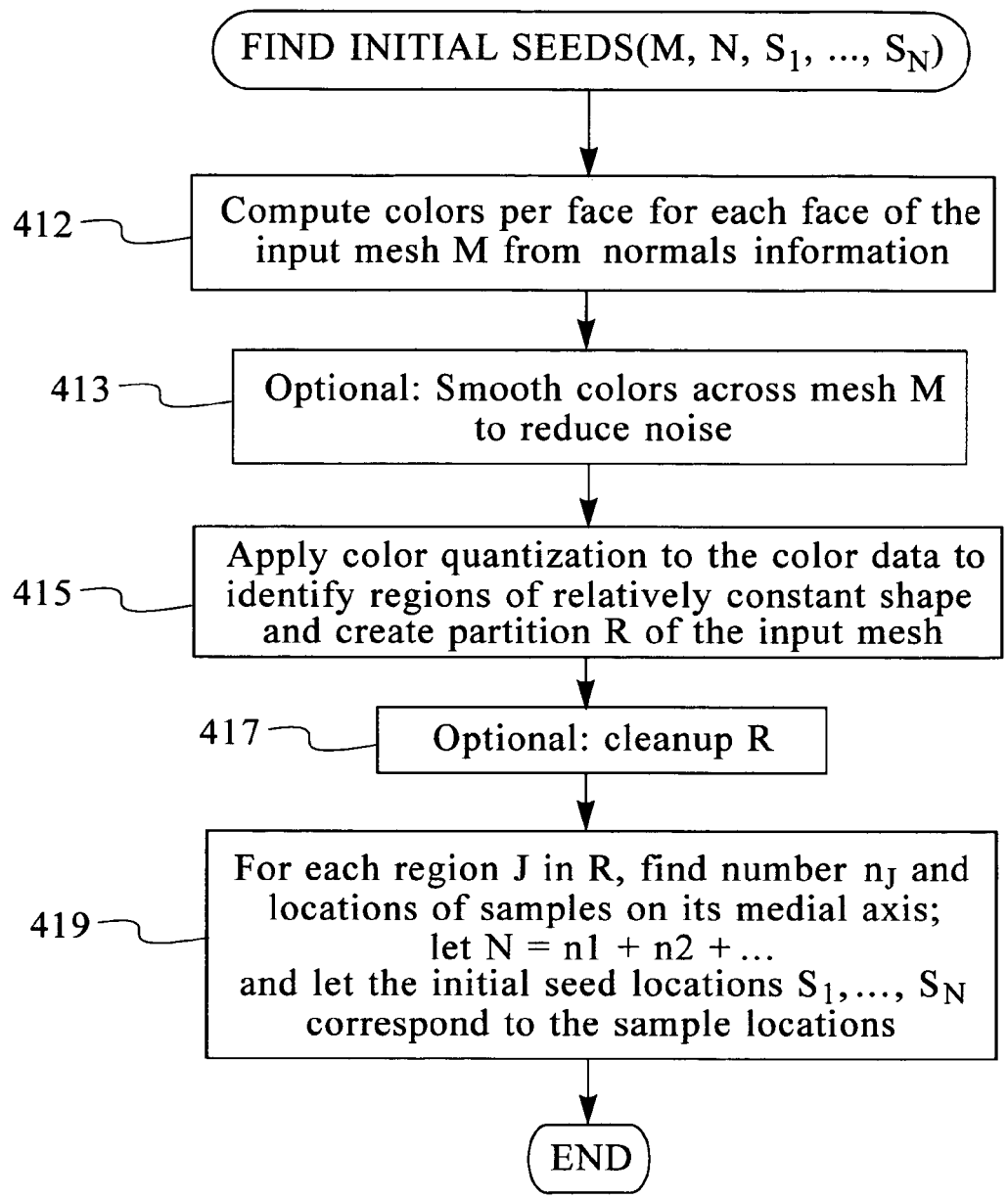
FIG. 4A is a flow chart of an example automatic seed selection process.

FIG. 4A is a flow chart of an example automatic seed selection process.

Figure 2A:
FIGS. 2A through 2I, illustrate an example triangle mesh being decomposed by an atlas generator process.
Figure 2B:
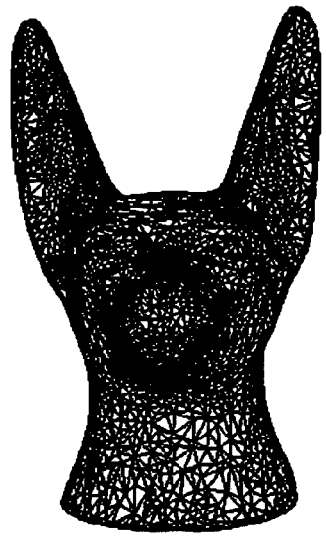
Figure 2C:
Figure 2D:
Figure 2E:
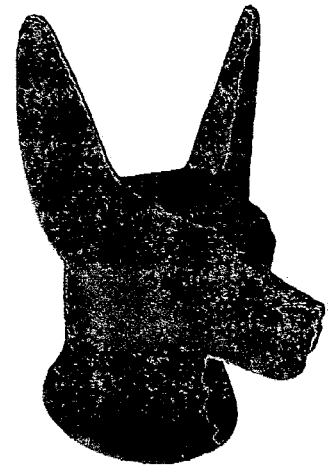
Figure 2F:
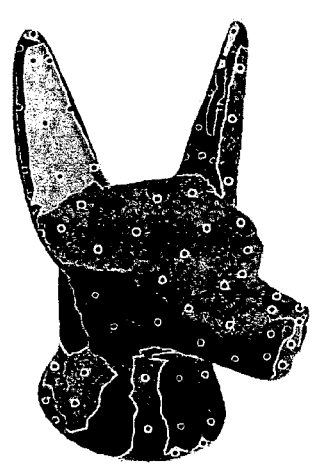

First, the mesh is split (412) into relatively flat regions based on information provided by the mesh normals. Mesh normals may be computed per vertex or per face. Without restricting the generality of our approach, in what follows we use the term normal to mean face normal. We encode each normal vector n as a color by assigning each of the three components of the vector $n=(nx, ny, nz)^T$ to each of the red, green, and blue components of a color. If we want to visualize the normal variation over the input mesh, we can render the model with colors, as illustrated in FIG. 2C. Following this step, a smoothing of the colors may optionally be applied (413) to reduce any noise present in the normal data. An example of Laplace-type smoothing of colors is shown in FIG. 2D. Partitioning the model into relatively flat regions translates into identifying regions of relatively constant color. Many methods for color quantization in images exist. Some of these are suitable for applying to meshes. For example, we use a MacQueen-type method (see Q. Du, M. D. Gunzburger, and L. Ju, Constrained Centroidal Voronoi Tessellations for Surfaces, SIAM Journal for Scientific Computing, 24(5), pp. 1488-1506, 2003) to perform color quantization directly on the input mesh (415). Other methods could also be used. The result of this quantization step is shown in FIG. 2E in which the differently colored areas correspond to regions obtained with this process. An optional cleanup step in which the boundaries between regions are straightened may be used (417). As seen in this figures, the regions generated at this step are relatively flat (by construction), but cannot typically be used for remeshing due to their irregular shape. Instead we use these regions to place seed points as follows. For each region, we compute an approximate medial axis (MA) and we sample it at several positions (419). These sample points are included into the set of seeds. While the MA approximation and sampling can be performed in many different ways, we opted for a simple and efficient method in which we first sample the boundary of the region and then we iteratively generate a set of points located at the centers of region faces with the property that their minimum distance to the boundary samples and to maximal balls around previously generated points is largest. The number of points thus generated depends on the size of the region. The seeds $S_1, \ldots, S_N$ are selected from this point set by sorting the points in the set according to some criterion and imposing a threshold value with respect to which points are accepted or eliminated. For instance, points in the point set could be sorted in descending order according to their maximum minimum distance to the boundary and/or other points in the set and a threshold could be chosen at the point of largest decrease in distance. Another example would be to always keep a fixed number of points from the sorted set. This process is illustrated in FIG. 7. FIG. 2F shows an example set of seed points on the input mesh of FIG. 2A.

Figure 4B:
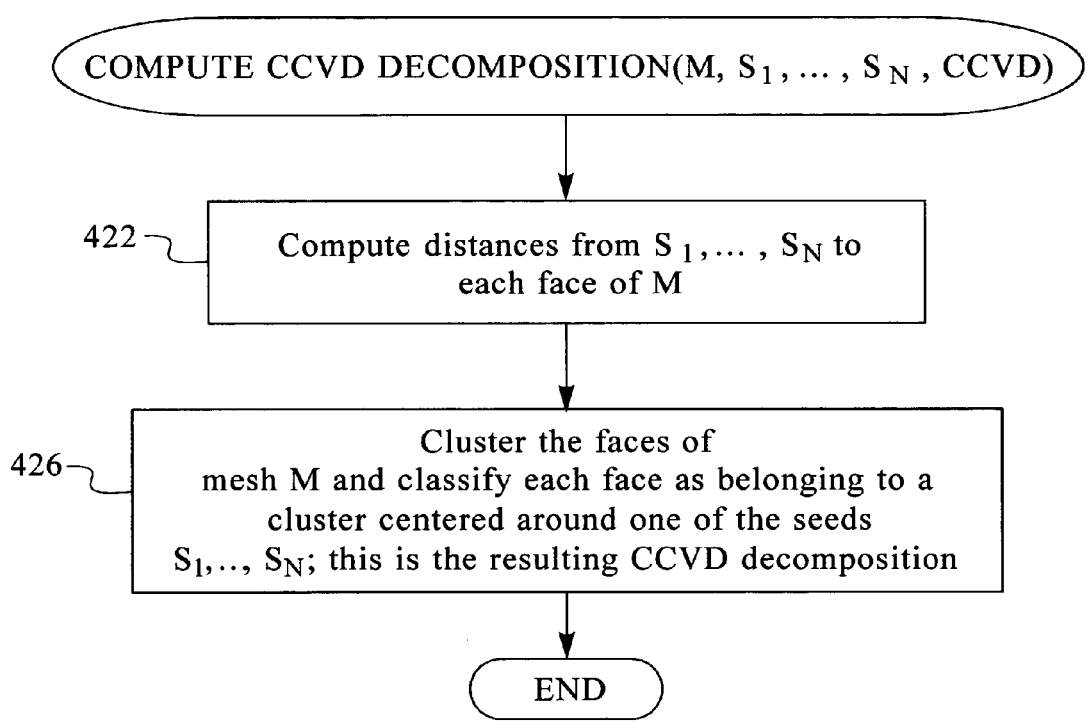
FIG. 4B is a flow chart of an initial partitioning by means of a constrained centroidal Voronoi diagram (CCVD) computation.

FIG. 4B is a flow chart of an initial partitioning by means of a constrained centroidal Voronoi diagram (CCVD) computation (430).

Figure 2G:
Figure 2H:
Figure 2I:
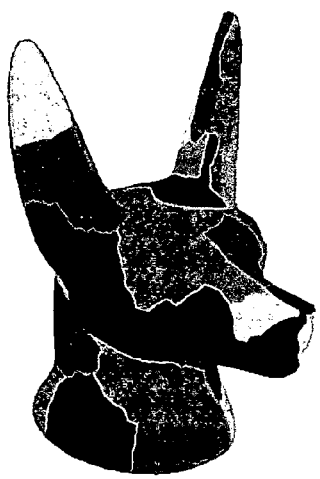

Having a set of N seeds on the input mesh, we compute a constrained centroidal Voronoi decomposition (CCVD) (420) of the mesh around the given seeds $S_1, \ldots, S_N$ (see FIG. 4B). For this we use again a MacQueen-type clustering algorithm (426) (see Q. Du, M. D. Gunzburger, and L. Ju, Constrained Centroidal Voronoi Tessellations for Surfaces, SIAM Journal for Scientific Computing, 24(5), pp. 1488-1506, 2003). Any clustering algorithm that produces a CCVD cold be used. Faces of the input mesh are classified based on their distance to the seeds. A face is assigned to a particular region if and only if the distance from that face to the seed of that region is shorter than the distance from that face to the other seeds. After all faces are classified, the position of each seed is recomputed, as the projection of the centroid of the faces in its region onto the input mesh. For distance computation (422) we use approximate geodesic distances over the mesh (see, for example, K. Polthier and M. Schmies, Straightest Geodesics on Polyhedral Surfaces, Mathematical Visualization, Ed: H. C. Hege, K. Polthier Springer Verlag, 1998, pp. 391, Preprint: TU-Berlin, SFB 288, Preprint No. 327, 1998). However, other types of distances may also be used. For example, Euclidean distances can be used for more efficient processing, especially when the seeds are placed in the center of relatively flat regions in which case Euclidean distances approximate well geodesic ones. An example of such a decomposition is shown in FIG. 2G. The cells of the constrained centroidal Voronoi decomposition thus computed form a partition of the input mesh. However, the computation of the Voronoi decomposition does not ensure that the resulting cells are height fields. For example, the mid regions on the ears of the 3D model of FIG. 2 shown in FIG. 2G completely surround the ear in a cylindrical fashion and thus are not height fields. Since we would like our final charts to have this property, we must consider the cells one at a time and further process those that are not height fields (430). See FIG. 4C.

Figure 4C:
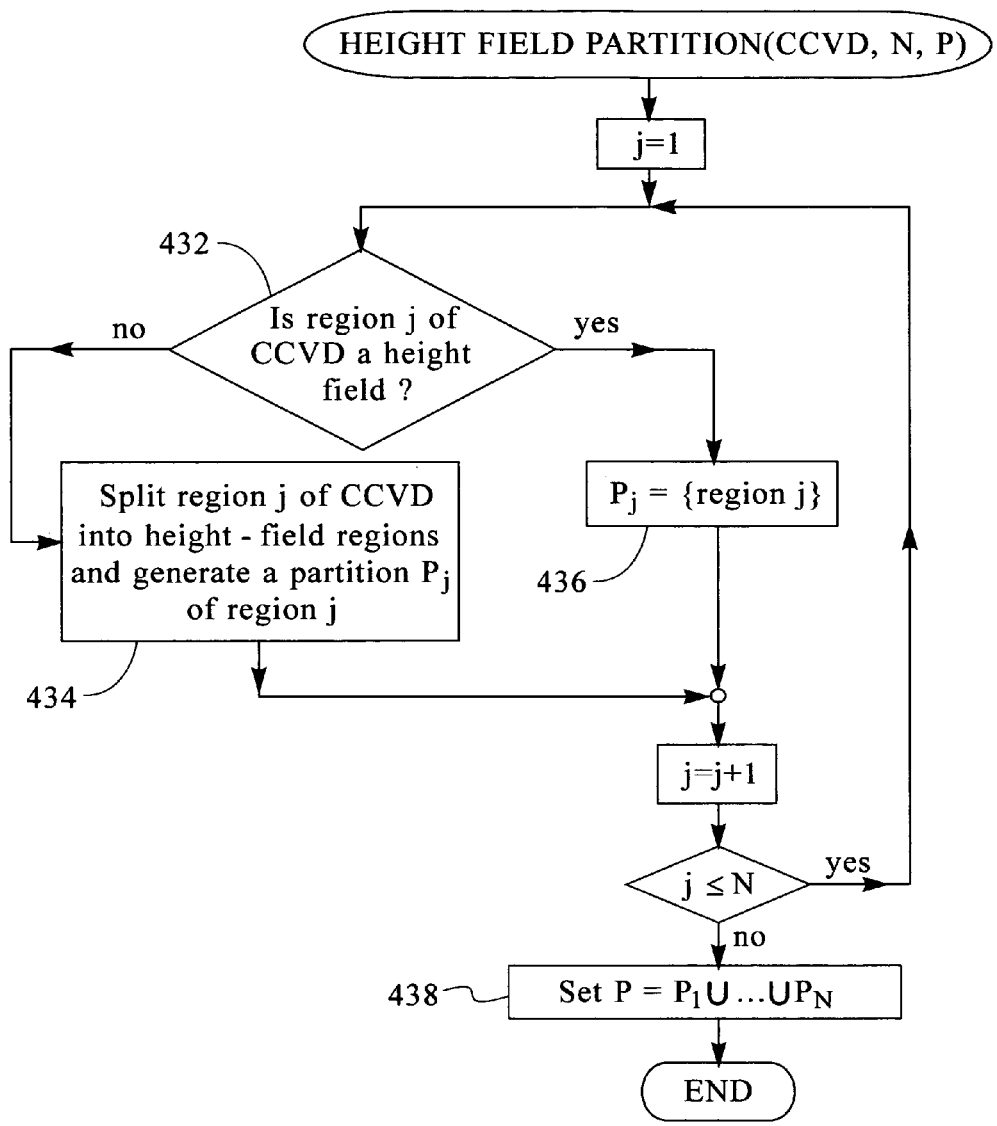
FIG. 4C is a flow chart of a refined partitioning obtained by splitting regions of the CCVD decomposition into heightfield regions.

FIG. 4C is a flow chart of a refined partitioning P obtained by splitting regions of the CCVD decomposition into height-field regions (430).

For each region that exhibits a normal variation greater than a certain threshold (432), we further split it into height fields using a color quantization process (434) similar to the one used to produce the initial quantization, but this time we restrict it within the cell. Otherwise the region remains unchanged (436). The set of all resulting regions forms the partition P (438). See also FIG. 2H and note the ear regions that are now split into several regions that roughly conform with the sides of the ears (the boundaries of these regions are approximately aligned with the ear features).

Figure 4D:
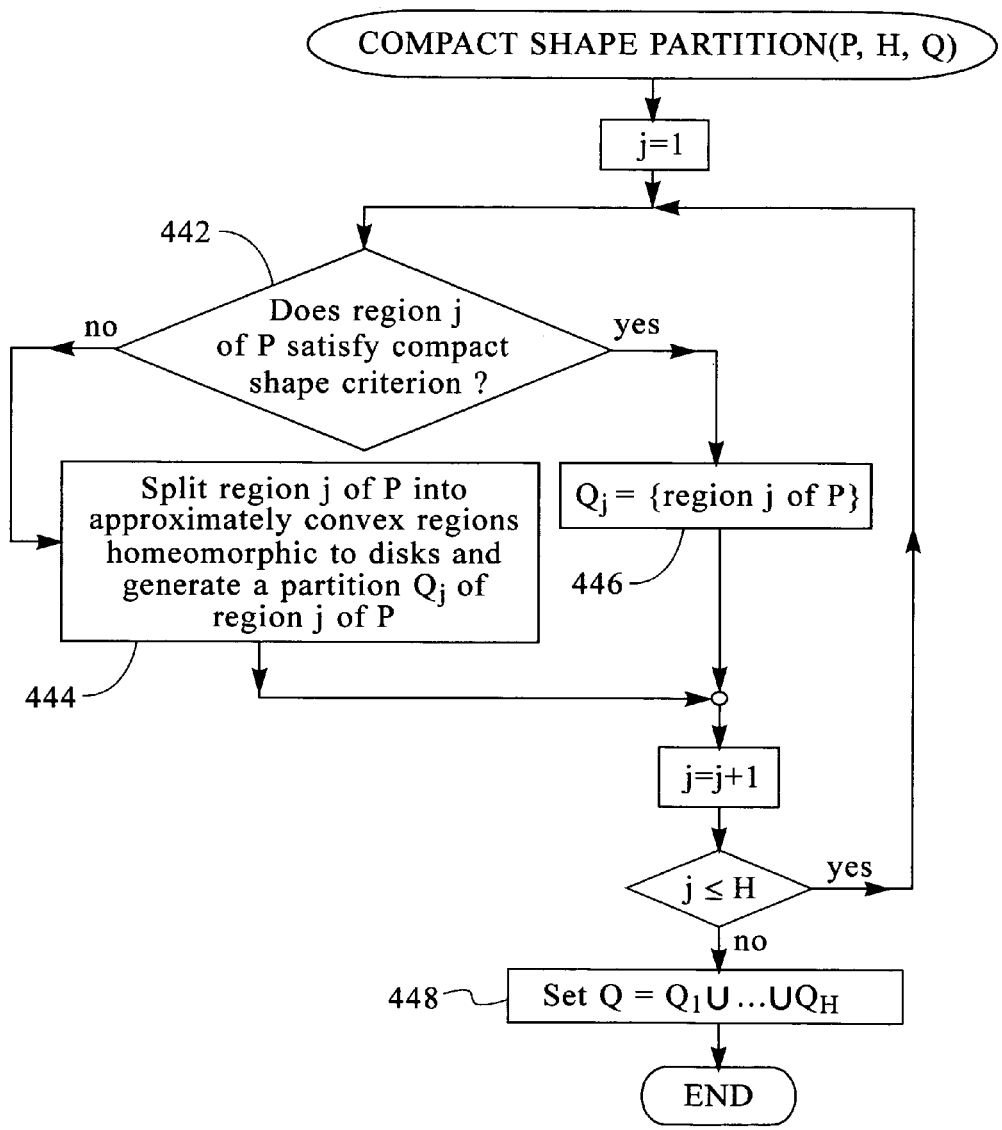
FIG. 4D is a flow chart of a further refined partition obtained by splitting height field regions into approximately convex regions with disk topology.

FIG. 4D is a flow chart of a further refined partition Q obtained by splitting height field regions of partition P into approximately convex regions homeomorphic to disks.

After a partition of the input mesh into height fields is obtained, a step of further ensuring that the resulting regions are nicely shaped consists of checking the shape of each region against a shape measure that quantifies whether or not the region is hoemomorphic to a disk (i.e., region boundary has exactly one connected component) and whether or not it is approximately convex (440). Regions that do not satisfy a shape compactness criterion (442) are further split into compact regions homeomorphic to disks (444) using a CCVD decomposition around medial axis samples. The CCVD decomposition process 420 is applied restrictively to each region that has to be split. The seeds used in this case can be selected randomly or using samples from the approximate medial axis of the region, similar to process 419 in FIG. 4A. Otherwise the regions remain unchanged (446).

An optional cleanup of the charts may optionally follow (450), see FIG. 4, in which boundaries between charts are straightened. For example, the straightening may be performed locally in the neighborhood of the original boundary, by applying a constrained Dijkstra algorithm (see T. H. Corman, C. E. Leiserson, and R. L. Rivest, Introduction to Algorithms, pp. 527, McGrawHill, 1990) to find the shortest path between the endpoints of the path within a certain distance from the original path.

The atlas thus obtained can be used directly for applications like texture mapping and mesh parameterization. In the following we describe the necessary processing to use the atlas decomposition for remeshing with semi-regular connectivity.

It is observed that each chart of the atlas has, on average, at most six neighboring charts. This follows from the process of constructing the atlas using Voronoi decompositions and from the property of Voronoi diagrams that the average number of Voronoi edges per Voronoi polygon does not exceed six (see A. Okabe, B. Boots, K. Sugihara, and S. N. Chiu, Spatial Tessellations: Concepts and Applications of Voronoi Diagrams, pp. 65, Wiley & Sons, Ltd., 2000).

Figure 4E:
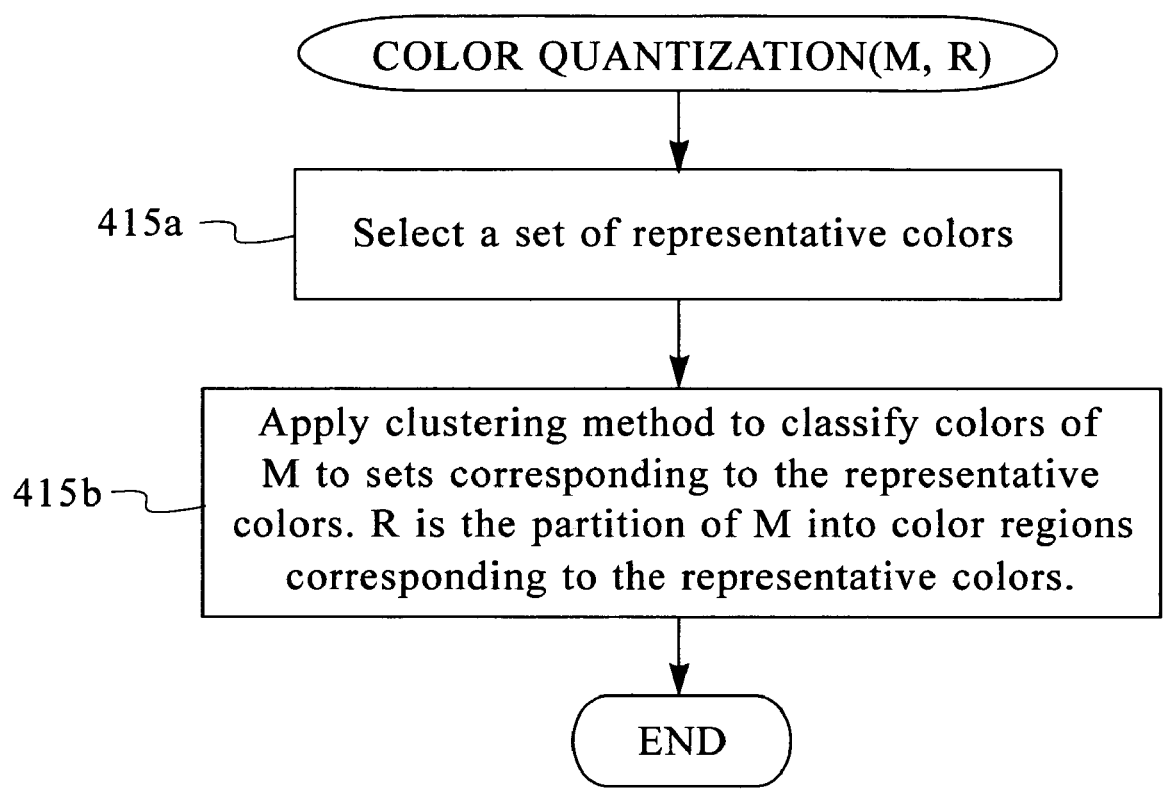
FIG. 4E is a flow chart of a color quantization process for classifying faces of the input mesh into classes according to their color.

FIG. 4E is a flow chart of a color quantization process for classifying faces of the input mesh M into classes according to their color forming a partition R of the input mesh M (415).

A set of representative colors (415a) is defined to correspond to a small subset of all possible normal directions. For example, by choosing the subset of normal directions to be the 14 normal vectors corresponding to the faces and vertices of the unit cube and by mapping these normals to colors as previously described, we obtain a set of 14 colors that can be viewed as a seed set for the quantization process. All faces of the input mesh can be classified based on their color using MacQueen's approach (415b) to belong to one of the classes defined by the seeds (the one with the closest seed in color space). Note that the choice of 14 representative colors is just an example, any other number and choice of subset of normal directions may be used. The seeds themselves are adjusted during the process to the centroids of their regions (this is, in effect, a CCVD in color space).

Figure 2J:
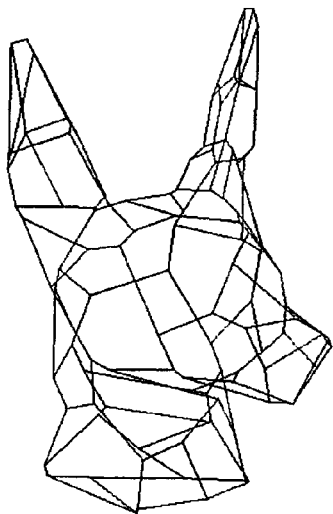
FIG. 2J through 2K illustrate a polygonal mesh extracted from the decomposed model in FIG. 2I by a mesh extraction process.
Figure 2K:
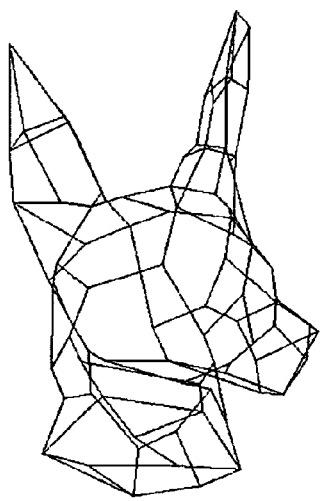
Figure 2L:
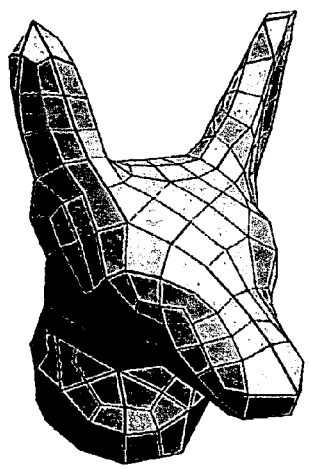
FIG. 2L is a quadrilateral base mesh derived from the polygonal mesh using the mesh extraction process.

FIG. 5 is a flow chart of the quadrilateral base mesh extraction process. In a preferred embodiment of process 500, the atlas decomposition A obtained through process 400 is used to extract a coarse quadrilateral mesh MQ roughly approximating the input mesh M. Reference can also be made to FIGS. 2J through 2L.

Having found an atlas decomposition over the input mesh with charts corresponding to approximately flat regions of the models and homeomorphic to disks, a quadrilateral base mesh corresponding to this decomposition is extracted using a quadrilateral mesh extraction process 500 as shown in FIG. 5. First a set of boundary curves between the charts of the atlas are extracted (510). The curves are subsequently simplified into polylines (520). Trivial simplification to the line segment between the first and last point of each curve may typically be sufficient, due to the simple shape of the charts ensured during the atlas generation process 400. Alternatively, the simplification can be done using any suitable curve simplification method (for an example using a 3D version of the well known Douglas-Peucker algorithm; see D. H. Douglas and T. K. Peucker, Algorithms for the Reduction of the Number of Points required to Represent a Digitized Line or Its Caricature, The Canadian Cartographer, 10(2), pp. 112-122, 1973). The simplified curves bordering each chart form a polygon approximating that chart. The set of all such polygons form a coarse polygonal mesh that approximates the input mesh (see FIG. 2J). It follows from the previous observation that, on average, the resulting polygons have at most six sides. In some cases, due to the approximate nature of the chart decomposition processes, certain charts that should meet at a single point make contact along a curve. Such typically small curves introduce small segments in the coarse polygonal mesh that are unnecessary. Removing such segments is an optional step (530) that in some cases may help clean up the resulting polygonal mesh transforming it into one with faces with fewer sides (see also FIG. 2K and note, for example, the removal of the short edges at the tip of the ears). Mesh cleanup may also include some form of mesh optimization to better distribute the elements of the coarse mesh with respect to the input mesh. A quadrilateral mesh is then obtained from the polygonal mesh by quadrangulating it (540). In principle, any quadrangulation process may be applied, for example by simply inserting a point at the center of each face and in the middle of all edges and splitting each polygon onto quads sharing a vertex at the center of that polygon. However, methods that avoid introducing a large number of extraordinary vertices (especially with high valence) are preferred. As an example, we mention the possibility of splitting every polygon with even number 2 k of sides into k−1 quadrilaterals and every polygon with 2 k+1 sides into k−1 quadrilaterals and one triangle and performing a global split after that (only if there are any faces left that are not quadrilaterals). This has the advantage of reducing the number of extraordinary vertices (i.e., vertices of valence different than four). An example of a quadrangulated mesh is shown in FIG. 2L.

FIG. 6 is a flow chart of the resampling and multiresolution analysis process 600.

Figure 2M:
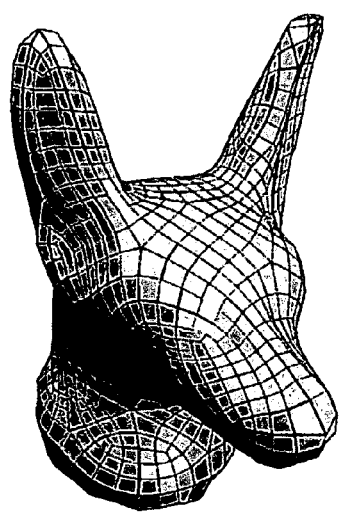
FIGS. 2M through 2O illustrate a multiresolution subdivision hierarchy built on the quadrilateral base mesh of 2L as a result of resampling and multiresolution analysis by a resampling process.
Figure 2N:
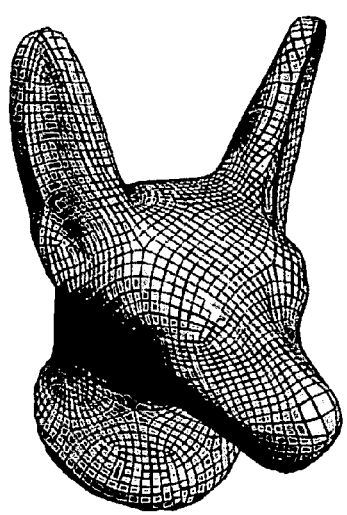
Figure 2O:
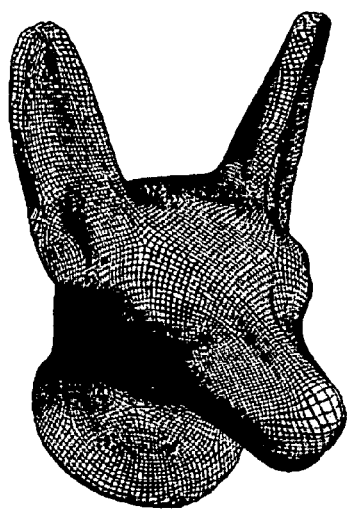

Having established a coarse quadrilateral mesh MQ, a multiresolution quadrilateral subdivision surface MQSS can be extracted by resampling the original geometry M over the faces of the coarse polygonal mesh at dyadic positions corresponding to the finest subdivision level desired, followed by multiresolution analysis to propagate the data from the finest level of the subdivision hierarchy to coarser levels. In a preferred implementation this could be done by first applying L-1 steps of subdivision to the quadrilateral mesh extracted using process 500; where L is the desired number of levels in the final multiresolution hierarchy, thus generating a fine mesh D which constitutes a resampling domain for the final representation (610). A resampling of the original geometry at positions corresponding to the vertices of the subdivided domain mesh D yields a resampled version R of the original mesh with subdivision connectivity (620). Multiresolution analysis can then be used to decompose R over the faces of the base mesh, thus generating a multiresolution quadrilateral-based subdivision surface (MQSS) representation for the input mesh (630). For an example of multiresolution analysis of meshes see H. Biermann et al., Cut-and-Paste Editing of Multiresolution Surfaces, ACM Transactions on Graphics, vol 21(3), pp. 312-321, Proceedings of ACM Siggraph 2002, San Antonio, July 2002. An optional optimization of the resulting MQSS may also follow (640). FIGS. 2M, 2N, and 2O illustrate three consecutive levels of a multiresolution subdivision hierarchy for the mesh in 2A after completion of the conversion process.

Figure 7A:
FIG. 7 further illustrates the preferred seed selection process described in FIG. 4A.
Figure 7B:
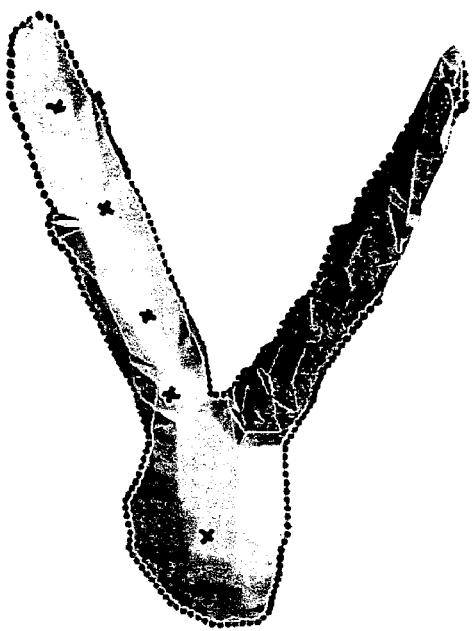
Figure 7C:
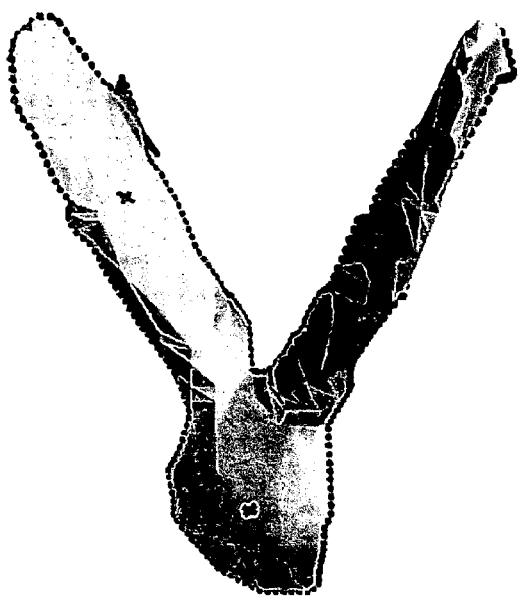

FIG. 7 further illustrates the main steps of the preferred seed selection process described in FIG. 4A: FIG. 7(A) shows an approximately flat region of an input model; FIG. 7(B) shows samples computed in an approximate medial axis; FIG. 7(C) illustrates the final seeds, after discarding unnecessary samples. Region boundary samples are shown as filled circles. Approximate medial axis samples are shown as 'x' marks.

All references cited above are herein incorporated by reference in their entirety.

We claim:

1. A computer system comprising one or more memories, one or more central processing units and further comprising:
   one or more input devices for receiving one or more input meshes representing a three dimensional model, the three dimensional model capable of being represented as a 2-manifold polygon mesh; and
   a conversion process that automatically converts the input mesh to a multiresolution quadrilateral-based subdivision surface (MQSS) representation.

2. A computer system comprising one or more memories, one or more central processing units and further comprising:
   one or more input devices for receiving one or more input meshes representing a three dimensional model, being a 2-manifold polygon mesh, each of the input meshes having one or more features, each of the features being a part of the model with a different curvature and scale than one or more adjacent parts; and
   a conversion process that automatically converts the input mesh to a multiresolution quadrilateral-based subdivision surface (MQSS) representation.

3. A system, as in claim 1, where the system further comprises one or more of the flowing: an output for displaying the MQSS, a process for storing the MQSS in one or more of the memories.

4. A computer system comprising one or more memories, one or more central processing units and further comprising:
   one or more input devices for receiving one or more input meshes representing a three dimensional model, each input mesh being a 2-manifold polygon mesh, each of the input meshes having one or more features, a feature being a perceptually important part of the model with a different curvature than one or more adjacent parts; and
   a conversion process that automatically converts the input mesh into a multiresolution quadrilateral-based subdivision surface (MQSS) having a base mesh with one or more base mesh edges where one or more of the base mesh edges correspond to one of the features.

5. A computer system, as in claim 4, where the MQSS is used for one or more of the following: model editing, compression of the input mesh, a network transmission, model storage, a level of detail representation, an input model parameterization.

6. A computer system, as in claim 4, where the base mesh is one or more of the following: a parameterization domain for the input model, a coarse approximation of the input model, a texture mapping domain.

7. A computer system, as in claim 4, where the feature is one or more of the following: a perceptually salient ridge on the input model, a perceptually salient ravine on the input model, a perceptually salient crease, a perceptually salient curve, or some other perceptually salient element.

8. A computer system, as in claim 4, where the conversion process comprises the steps of:
   a. generating an atlas decomposition of the input mesh by using an atlas generation process;
   b. extracting a quadrilateral base mesh using a quadrilateral mesh extraction process, the atlas, and the input mesh; and
   c. extracting the MQSS with one or more levels from the input mesh and the quadrilateral base mesh.

9. A computer system, as in claim 8, where the quadrilateral mesh extraction process comprises the steps of:
   a. extracting a boundary set of one or more boundaries curves between one or more charts in the atlas; and
   b. for each of the charts, creating a polygonal approximation of the chart, by simplifying one or more boundary curves corresponding to the charts, resulting in a coarse polygonal mesh.

10. A computer system, as in claim 4, where the atlas generation process comprises the steps of:
   a. selecting a seed set of one or more chart seeds;
   b. computing a constrained centroidal Voronoi decomposition of the input mesh around the chart seeds, the constrained centroidal Voronoi decomposition having one or more cells;
   c. splitting the cells that do not satisfy a height field approximation criterion into height fields resulting in a partition of the input mesh comprising one or more regions that are approximate height fields; and
   d. splitting each region that does not satisfy a compact shape criterion into one or more subregions that are approximately convex and homeomorphic to discs, resulting in the atlas that is a refined decomposition of the input mesh comprising one or more charts, each chart being one of the approximate height fields each chart being approximately convex and homeomorphic to a disc.

11. A computer system, as in claim 10, further comprising the step of:
   adjusting one or more boundaries between one or more pairs of charts.

12. A computer system, as in claim 10, where the selecting the seed set is a random process.

13. A computer system, as in claim 12, where the selecting the seed set is done by performing a seed selection process comprising the following steps:
   a. computing colors for the faces of the input mesh from the information provided by the mesh normals;
   b. applying an optional smoothing to colors to reduce noise;
   c. applying a color quantization procedure to identify regions of relatively constant shape over the input mesh;
   d. further adjusting the relatively constant shape regions by optionally straightening the boundaries between them; and
   e. computing an approximate medial axis for each of the relatively constant shape regions and extracting a small set of medial axis samples from regions and letting the seed set be the union of these samples.

14. A computer system, as in claim 13, where the color quantization process comprises the following steps:
   a. selecting a set of representative colors; and
   b. applying a color classification procedure into classes corresponding to the set of representative colors.

15. A computer system, as in claim 14, further comprising the step of:
   c. removing unnecessary faces and edges of the coarse polygonal mesh.

16. A computer system, as in claim 14, further comprising the step of:
   c. quadrangulating the coarse polygonal mesh if the coarse polygonal mesh is not a quadrilateral mesh.

* * * * *